United States Patent
Choorakkot Edakkunni et al.

(10) Patent No.: US 9,338,055 B2
(45) Date of Patent: May 10, 2016

(54) VIRTUAL ROUTER UPGRADE VIA GRACEFUL RESTART

(71) Applicant: Cisco Technology, Inc., San Jose, CA (US)

(72) Inventors: Gopakumar Choorakkot Edakkunni, Milpitas, CA (US); Dezhong Cai, San Jose, CA (US); Saikat Ray, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 94 days.

(21) Appl. No.: 13/834,111

(22) Filed: Mar. 15, 2013

(65) Prior Publication Data

US 2014/0269254 A1 Sep. 18, 2014

(51) Int. Cl.
| | | |
|---|---|---|
| H04L 12/24 | (2006.01) | |
| H04L 12/713 | (2013.01) | |
| G06F 9/445 | (2006.01) | |
| G06F 11/14 | (2006.01) | |
| H04L 12/775 | (2013.01) | |
| G06F 9/46 | (2006.01) | |
| H04L 12/755 | (2013.01) | |
| H04L 12/703 | (2013.01) | |
| G06F 11/20 | (2006.01) | |
| H04L 29/08 | (2006.01) | |
| H04L 12/751 | (2013.01) | |
| H04L 29/14 | (2006.01) | |

(52) U.S. Cl.
CPC ............ *H04L 41/082* (2013.01); *H04L 45/586* (2013.01); *G06F 8/65* (2013.01); *G06F 9/461* (2013.01); *G06F 11/1438* (2013.01); *G06F 11/2028* (2013.01); *G06F 11/2033* (2013.01); *H04L 41/0654* (2013.01); *H04L 45/02* (2013.01); *H04L 45/021* (2013.01); *H04L 45/28* (2013.01); *H04L 45/58* (2013.01); *H04L 67/34* (2013.01); *H04L 69/40* (2013.01)

(58) Field of Classification Search
None
See application file for complete search history.

(56) References Cited

U.S. PATENT DOCUMENTS

| | | | | |
|---|---|---|---|---|
| 6,535,924 | B1 * | 3/2003 | Kwok | G06F 8/67 709/242 |
| 7,107,329 | B1 * | 9/2006 | Schroder | G06F 8/67 709/221 |
| 7,116,634 | B1 * | 10/2006 | Hanselmann | H04L 1/1642 370/219 |
| 7,383,541 | B1 * | 6/2008 | Banks | G06F 8/65 717/126 |
| 7,515,600 | B1 * | 4/2009 | Savage | H04L 45/02 370/426 |
| 7,940,650 | B1 * | 5/2011 | Sandhir | H04L 45/28 340/2.23 |
| 8,340,090 | B1 * | 12/2012 | Bettink | H04L 49/70 370/230 |
| 8,572,225 | B2 * | 10/2013 | Scudder | H04L 45/02 709/223 |

(Continued)

*Primary Examiner* — Faruk Hamza
*Assistant Examiner* — Andrew Oh
(74) *Attorney, Agent, or Firm* — Patterson & Sheridan, LLP

(57) ABSTRACT

Embodiments herein generally provide techniques for upgrading a virtual router (VR) comprising first and second physical routers used to route data between network devices. Before upgrade the first physical router, one or more ports of the router are disabled which causes data paths previously flowing through the first router to flow through the second router. After performing the upgrade, the first router is rebooted and uses a unique router ID to discover the network topology of an external network coupled to the VR. Once the network topology is identified, the first router activates a routing application (e.g., a BGP routing application) which enables the router to process control plane traffic received from the second router. Once routing information is gathered, the first router is able to assume the responsibility of forwarding data packets in the network, thereby freeing the second router to be upgraded.

17 Claims, 6 Drawing Sheets

(56) References Cited

U.S. PATENT DOCUMENTS

| | | | | |
|---|---|---|---|---|
| 8,799,422 B1* | 8/2014 | Qu | H04L 45/00 | 709/220 |
| 8,806,032 B2* | 8/2014 | Van der Merwe | H04L 45/02 | 709/227 |
| 9,021,459 B1* | 4/2015 | Qu | G06F 8/65 | 710/33 |
| 2003/0210705 A1* | 11/2003 | Seddigh | H04L 12/5695 | 370/419 |
| 2004/0179476 A1* | 9/2004 | Kim | H04L 12/40143 | 370/230 |
| 2005/0047326 A1* | 3/2005 | Puon | H04L 41/082 | 370/216 |
| 2005/0102384 A1* | 5/2005 | Ueno | H04L 12/2803 | 709/223 |
| 2005/0111352 A1* | 5/2005 | Ho | H04L 43/16 | 370/219 |
| 2005/0169281 A1* | 8/2005 | Ko | H04L 45/60 | 370/400 |
| 2005/0177634 A1* | 8/2005 | Scudder | H04L 45/22 | 709/225 |
| 2005/0213498 A1* | 9/2005 | Appanna | G06F 11/2028 | 370/216 |
| 2006/0203828 A1* | 9/2006 | Kumazawa | H04L 45/00 | 370/400 |
| 2006/0233182 A1* | 10/2006 | Appanna | H04L 45/04 | 370/401 |
| 2007/0014231 A1* | 1/2007 | Sivakumar | H04L 45/04 | 370/216 |
| 2007/0162565 A1* | 7/2007 | Hanselmann | G06F 8/67 | 709/219 |
| 2007/0174685 A1* | 7/2007 | Banks | G06F 11/2097 | 714/12 |
| 2007/0253434 A1* | 11/2007 | Oswal | H04L 45/00 | 370/401 |
| 2007/0293951 A1* | 12/2007 | Takahashi | H04L 43/0817 | 700/1 |
| 2009/0116496 A1* | 5/2009 | Savage | H04L 45/00 | 370/400 |
| 2009/0257440 A1* | 10/2009 | Yan et al. | | 370/401 |
| 2009/0290591 A1* | 11/2009 | Zhang | H04L 45/00 | 370/401 |
| 2010/0008233 A1* | 1/2010 | Ee | H04L 12/2697 | 370/241 |
| 2010/0293293 A1* | 11/2010 | Beser | H04L 45/00 | 709/238 |
| 2011/0228770 A1* | 9/2011 | Dholakia | H04L 45/586 | 370/390 |
| 2012/0036169 A1* | 2/2012 | Grinshpun | G06F 9/461 | 707/803 |
| 2012/0158994 A1* | 6/2012 | McNamee | H04L 41/12 | 709/238 |
| 2013/0145359 A1* | 6/2013 | Hanselmann | G06F 8/67 | 717/173 |
| 2013/0322458 A1* | 12/2013 | Nagumo | H04L 49/15 | 370/401 |
| 2014/0003227 A1* | 1/2014 | Scudder | H04L 45/021 | 370/218 |
| 2014/0173133 A1* | 6/2014 | Ammireddy | H04L 45/02 | 709/241 |
| 2014/0289731 A1* | 9/2014 | Wei | G06F 9/4843 | 718/100 |

* cited by examiner

VIRTUAL ROUTER UPGRADE VIA GRACEFUL RESTART

TECHNICAL FIELD

Embodiments presented in this disclosure generally relate to upgrading virtual routers, and more specifically, to using a graceful restart function to upgrade a virtual router.

BACKGROUND

Upgrading a network device—e.g., a router, switch, bridge, server, and the like—may require that the device stop transmitting, receiving, or forwarding data packets. In turn, this outage may cause other network devices (e.g., routers, switches, or client devices) coupled to the device being upgraded to not receive data packets. For example, if an end device relies on a router to access an external network (e.g., the Internet) but the router is offline while an upgrade is being performed, the end device may be unable to transmit or receive data traffic via the external network.

Often, a network administrator may choose to upgrade network devices when data throughput is the lowest, thereby minimizing the service interruption. Alternatively, different upgrade techniques may allow a network device to be upgraded while still permitting data plane traffic to flow through the device. However, these techniques apply to a limited number of network device architectures and/or software updates. For example, if the upgrade includes updating hardware responsible for forwarding data traffic, the network device may not be able to perform the upgrade without a service interruption.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
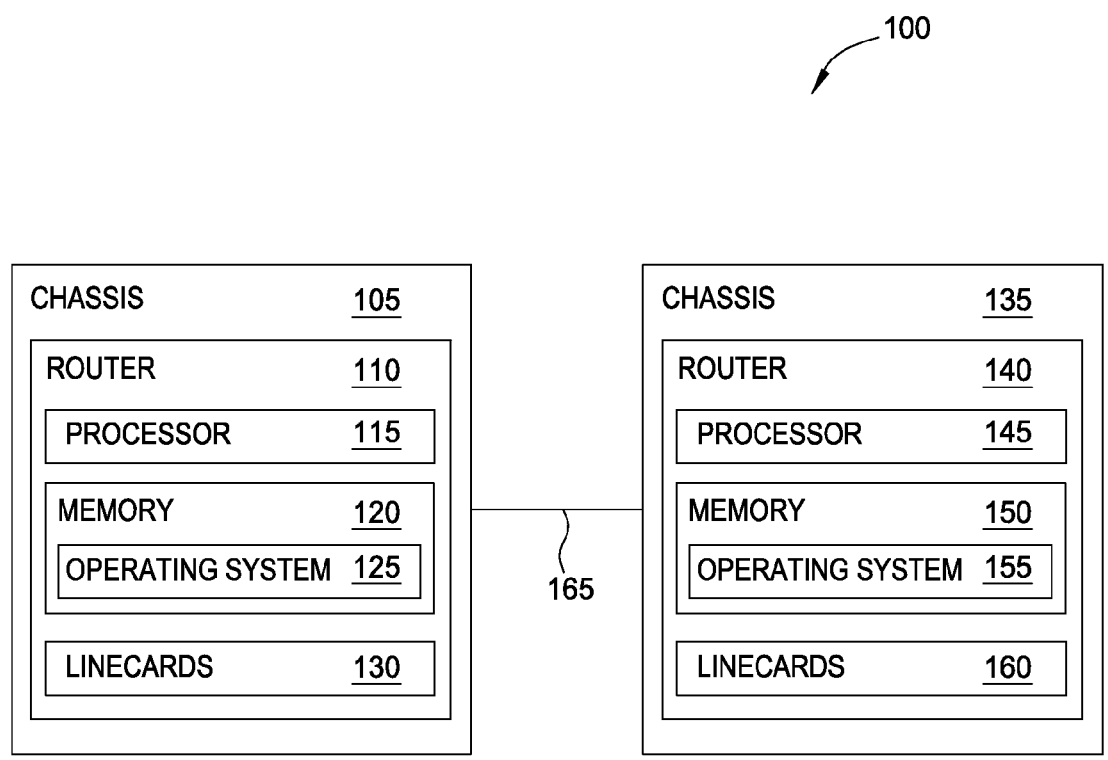
FIG. 1 is a block diagram of a virtual router, according to one embodiment disclosed herein.

Embodiments of the present disclosure include a method and a computer program product for upgrading a virtual router comprising at least a first and a second physical router. The method and computer product include disabling the first physical router such that data paths previously flowing through the first physical router flow through the second physical router. After upgrading the first physical router, the method and computer product starting a first routing application on the first physical router where the second physical router is configured to forward received control plane packets associated with the first routing application to the first physical router. The method and computer product receiving, at the first physical router, routing information identifying user devices connected to a remote network device. after resolving data routes for transferring data traffic to the user devices connected to the remote network device based on the routing information, the method and computer product disable the second physical router such that data paths previously flowing through the second physical router flow through the first physical router. The method and computer product upgrade the second physical router.

Another embodiment of the present disclosure is a virtual router used to route data. The virtual router includes a first physical router, a second physical router, and an interconnect communicatively coupling the first and second physical routers. The first physical router is configured to disable one or more ports such that data paths previously flowing through the first physical router flow through the second physical router and, after performing a first upgrade, start a first routing application where the second physical router is configured to forward received control plane packets associated with the first routing application to the first physical router. The first physical router is also configured to receive routing information identifying user devices connected to a remote network device. The first physical router is further configured to resolve data routes for transferring data traffic to the user devices connected to the remote network device based on the routing information. The second physical router is configured to, after the data routes are resolved on the first physical router, disable one or more ports such that data paths previously flowing through the second physical router flow through the first physical router and perform a second upgrade.

Example Embodiments

Embodiments described herein provide techniques for upgrading a virtual router (VR), preferably in a manner that minimizes interruption to data flowing through the VR. A VR includes at least two physical routers that are connectively coupled in order to share a common control plane. To the perspective of devices connected to the VR, the two (or more) physically distinct routers behave like a single router. For example, both routers may share the same router ID. If one router in the VR fails, the connected device may automatically switch to the other router, thereby maintaining connectivity and data flow through the VR.

Various protocols, such as In-Service Software Upgrade (ISSU) or Stateful Switch Over (SSO), enable network devices to upgrade different aspects of the device without interrupting the flow of data traffic through the device. For example, during an ISSU, a network administrator may apply bug fixes and deploy new features and services while a router continues to forward packets in the data plane. However, not every upgrade can be performed using an ISSU. For example, installing new software, upgrading existing software to newer version, or upgrading firmware and hardware may not be able to be performed while maintaining data flow in the data plane. Instead, the embodiments disclosed herein describe a technique for performing these types of updates to physical routers in a VR using a graceful restart. Generally, a graceful restart is a function supported by various protocols (e.g. Border Gateway Protocol (BGP) and targeted Label Distribution Protocol (tLDP)) that prevents network devices from altering data routes upon detecting a restart in a peer device.

To upgrade the VR, one router in the VR is taken offline while the upgrade is performed. Service is maintained by routing all data and control plane traffic through the other router in the VR. Because the upgrade may result in the router losing the previously stored data routes, the upgraded router may relearn the different routes and addresses associated with connected devices.

In one embodiment, the VR is used to connect client devices that are located at different sites in, for example, a VPN. To route data between these sites, the router must relearn the routing information (e.g., different data routes and prefixes) associated with the client devices. When a remote device (e.g., another router) associated with the client devices detects that the VR has performed a graceful restart, the remote device transfers the required routing information to the non-upgraded router of the VR which then forwards this information to the upgraded router. Eventually, the upgraded router relearns the routing information that was lost during the upgrade. The upgraded router then assumes the data routing responsibilities thereby permitting the non-upgraded router to be taken offline and upgraded. Once both routers have been upgraded, the control planes of the routers are rejoined. In this manner, the physical routers in a VR may be sequentially upgraded while minimizing data loss resulting from taking the routers offline.

FIG. 1 is a block diagram of a VR 100, according to one embodiment disclosed herein. The VR 100 includes at least two physically distinct routers: router 110 and router 140. Although the present disclosure discusses using a graceful restart to upgrade a VR 100 containing two routers, the disclosure is not limited to such and contemplates using the embodiments discussed herein to upgrade VRs with any number of physically distinct routers. The routers 110, 140 are contained in respective chassis 105, 135. In one embodiment, the chassis 105, 135 are structures that enclose the various interconnected components of the routers 110 and 140. Furthermore, the chassis 105, 135 may provide a frame on which to mount the components of the routers 110, 140. For example, chassis 105 may be designed to include support elements for mounting the linecards 130 in the chassis 105 as well as openings for data ports that enable the linecards 130 to receive and forward data packets. Further still, the chassis 105 and 135 may be mounted into a rack or other storage mechanism.

Routers 110, 140 include processors 115, 145 and memories 120, 150. Processors 115, 145 may be implemented using one or more processors that may include any number of processing cores. Moreover, processors 115, 145 may be implemented using any processor design that is capable of performing the functions described herein.

Memories 120, 150 may include both volatile and non-volatile memory elements such as RAM, Flash memory, internal or external hard drives, EPROMs and the like. The memories 120, 150 store the operating systems 125 and 155 that include logic for controlling and monitoring the different functions performed by routers 110, 140. Operating systems 125, 155 may be any operating system that enables the routers 110, 140 to be virtualized into a single VR. In one embodiment, the routers 110, 140 in VR 100 share the same control plane which enables the routers 110, 140 to synchronize the different data routes passing through the VR 100. Moreover, in one embodiment, the operating systems 125, 155 are the same version or similar versions, thereby permitting the routers 110, 140 to share a common control plane. Moreover, the VR 100 may assign the same router ID (e.g., the same IP address) to both routers 110, 140.

To share a common control plane, VR 100 includes an interconnect 165 that communicatively couples router 110 to router 140. Using interconnect 165, routers 110, 140 can synchronize the data routes such that the routers 110, 140 behave like a single router. That is, to a network or client device coupled to the routers 110, 140, they function as a single router even though they are two separate and distinct units. In one embodiment, routers 110, 140 exchange only control plane traffic between the operating systems 125, 155 using interconnect 165. Stated differently, interconnect 165 is not used to exchange data plane traffic between the routers 110, 140. Interconnect 165 may be implemented using any wired or wireless communication means. For example, interconnect 165 may be implemented using a common Ethernet link or using a proprietary communication link designed specifically for creating a VR.

Routers 110, 140 include one or more line cards 130, 160. Generally, the line cards 130, 160 are modular electronic circuits on printed circuit boards that include a plurality of ports that receive and forward data packets. Routers 110, 140 may include a back plane (not shown) used to interconnect the line cards 130, 160 and facilitate internal routing between the line cards 130, 160. Also, the operating systems 125, 155 may use the back plane to configure and monitor the line cards 130, 160. In one embodiment, the chassis 105, 135 may be designed such that additional line cards 130, 160 may be added to the routers 110, 140.

Although FIG. 1 illustrates interconnecting routers to form a VR, the same techniques discussed herein may also be applied to other virtualized network devices—e.g., switches, bridges, and the like. Moreover, routers 110, 140 may share the same chassis even though they are two independent and distinct devices with separately controlled linecards 130.

Figure 2:
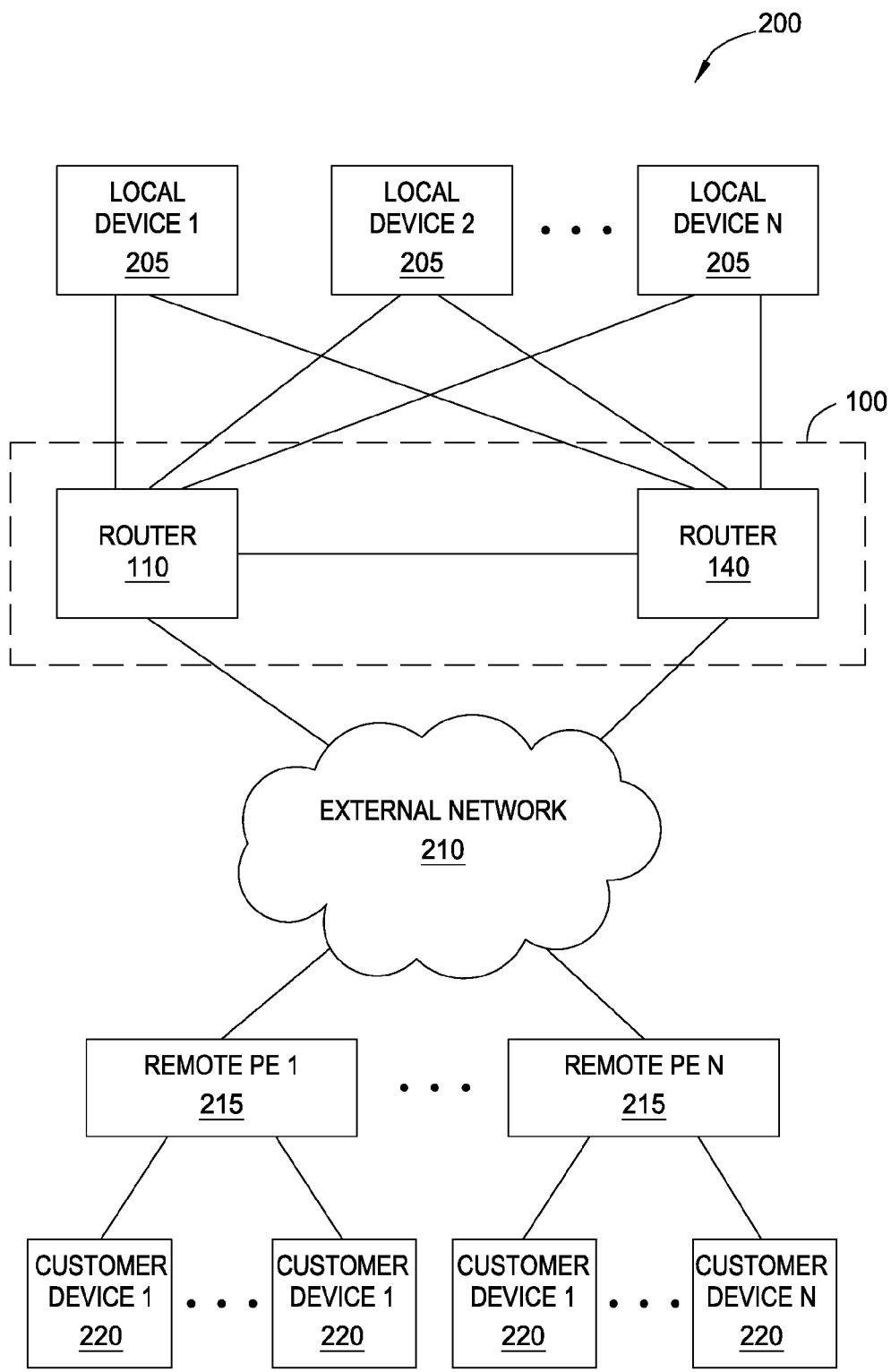
FIG. 2 is a block diagram of a network implementing the virtual router, according to one embodiment disclosed herein.

FIG. 2 is a block diagram of a network 200 implementing the VR 100, according to one embodiment disclosed herein. Network 200 includes a plurality of local devices 205 coupled to VR 100. As shown, each local device 105 may include separate, physical connections to both routers 110, 140 in VR 100. In this manner, if connectivity to one router is lost, the local device 205 uses the other connection to transmit data to the other router in the VR 100. Nonetheless, because the routers 110, 140 are integrated to form the VR 100, the local devices 205 view the separate routers 110, 140 as a single router—i.e., each local device 205 functions as if the devices 205 have two physical connections to the same router. The VR 100 is configured, however, to divide the data traffic between the routers 110, 140. For example, by using priority or cost scores, VR 100 may control which of the two connections the local devices 205 use to transfer data—e.g., local device 1 transmits data to router 110 while local device 2 transmits data to router 140. Alternatively, the cost scores may be used to assign different data streams to different routers 110, 140—e.g., local device 1 transmits some data streams through router 110 and other data stream through router 140 while local device 2 transmits data traffic only through router 110. In this manner, VR 100 permits the workload to be distributed across the routers 110, 140 by synchronizing the data paths used to transmit data from and to the local devices 205. Moreover, if a router fails, the data previously routed to the failed router is switched to the other router, thereby minimizing dropped data packets.

Routers 110, 140 are coupled to an external (or core) network 210 which may include hundreds or thousands of interconnected network devices (e.g., routers, switches, etc.). For example, external network 210 may be the network devices operated by an internet service provider (ISP). On the other side of the network 210, remote provider edge (PE) devices 215 are coupled to the external network 210. For example, the remote PEs 215 may also be routers or VRs like routers 110, 140 and VR 100. Each remote PE 215 is coupled to one or more customer devices 220. The customer devices 220 may include personal computers (e.g., laptop or desktops), servers, printers, and the like.

In one embodiment, local devices 205 and customer devices 220 may be part of the same VPN. For example, local devices 205 and customer device 200 may be owned by the same entity but may be located at different sites. For example, the local devices 205 and VR 100 may be located at one regional office while remote PEs 215 and customer devices 220 may be located at a different regional office. Nonetheless, VR 100 and remote PEs 215 may be configured to route data between the customer devices 220 and local devices 205 as if they were physically connected on a private network despite the fact the data may pass through a public or third-party network such as external network 210. For example, routers 110 and 140 may generate and store date routes for transferring data packets from the local devices 205 to the customer devices 220 while remote PEs 215 may store similar routing information for routing data packets form the customer devices 220 to the local devices 205. In this manner, the edge devices 110, 140, 215 can route packets through the external network 210 to an endpoint in the VPN.

Using the Graceful Restart Function in BGP to Update a VR

Figure 3:
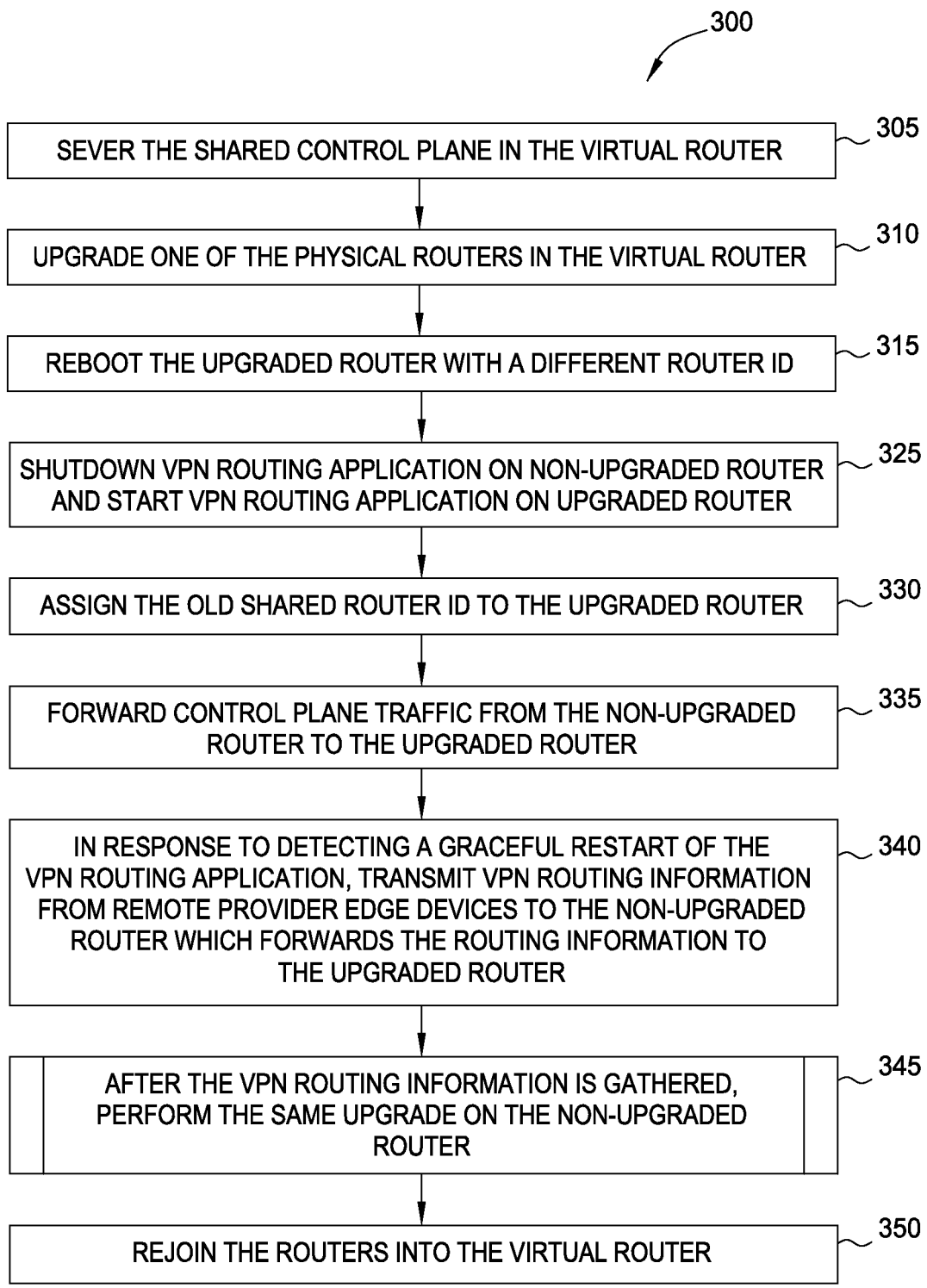
FIG. 3 illustrates a method of upgrading the individual routers in the virtual router, according to one embodiment disclosed herein.

FIG. 3 illustrates a method 300 of upgrading the individual routers in the virtual router, according to one embodiment disclosed herein. For example a network administrator may wish to update the operating systems 125, 155 on each of the routers 110, 140 shown in FIG. 1 from version 1.0 to 2.0. However, the VR may not be able to upgrade the routers using a protocol such as ISSU which would enable the routers to continue to route data plane traffic while the upgrade is being performed. Thus, the routers would need to be taken offline and service would be interrupted while the upgrade is performed. Instead of forcing the entire VR offline, method 300 discloses a technique for maintaining at least partial service to the devices connected to the VR when upgrading the routers contained in the VR.

In one embodiment, FIG. 3 illustrates a method 300 of upgrading a VR where BGP is used to transfer information about the routes between network devices. For example, referring to FIG. 2, VR 100 and remote PEs 215 may be edge devices (e.g., layer 3 networking) that includes local devices 205 and customer devices 220. However, this disclosure is not limited to such an arrangement. For example, method 300 shown in FIG. 3 may also be used for a VR that interconnects devices in a layer 2 networking that uses tLDP to transfer route information between the edge devices. Stated more generally, the embodiments disclosed herein may be used to upgrade a VR that implements any protocol that supports a graceful restart function. The details of the graceful restart function will be discussed in greater detail below.

At block 305, the shared control plane of the VR is severed before a router is upgraded. For example, the operating system of the router to be upgraded may delegate control solely to the operating system of the other router. In one embodiment, the data connection between the routers which enables the routers to exchange control data is disconnected. Referring to FIG. 1, disconnecting the data connection between the routers 110, 140 results in the routers 110 and 140 no longer communicating using interconnect 165 (although the physical connection may be maintained). Generally, the technique for disabling the control plane traffic between the routers in the VR is dependent on the particular VR configuration. For example, in some VR configurations, the control plane traffic may be disconnected by disabling one particular packet path between the routers.

In addition to severing the communication link between the routers, in one embodiment, the router to be upgraded may disable its ports to peer devices. For example, the router may disable the ports coupled to the local devices as well as the ports coupled to network devices in the external network. Because each local device or network device may have two independent data paths to the VR (i.e., a first data path connected to one of the routers and a second data path connected to the other router), disabling the ports on one routers causes the local and network devices that were using those ports to route traffic to the VR using the other data connection. Thus, network traffic continues to flow to the VR even as one of the routers is taken offline to be upgraded, albeit the bandwidth of the VR is reduced.

At block 310, one of the routers is upgraded. As mentioned previously, the upgrade may include a significant software upgrade that cannot be performed while data plane traffic continues to flow in the router. For example, the upgrade may involve upgrading the operating system's kernel to a new version which may affect the different hardware units in the router responsible for forwarding data plane traffic (e.g., the linecards). In other embodiments, the upgrade may update firmware that controls the hardware units (e.g., hardware FPGA updates) or even be installation of new hardware (e.g., a new linecard) in the router or a new software application that affects data plane forwarding.

In one embodiment, the upgrade is started only after the control plane is severed and the ports have been disabled. However, in other embodiments, some portion of the upgrade may occur while the control plane is being shared or the ports are still forwarding data plane traffic. For example, after receiving an upgrade image (e.g., router software), the router may first uncompress the image or execute pre-upgrade operations (such as backing up data) before severing the communication link or disabling its ports connected to peer devices.

At block 315, the upgraded router is rebooted but is assigned a different router ID than the other router in the VR. For example, as part of the upgrade, a configuration file may include a predefined setting that specifies the router ID (e.g., the IP address) to be used once the upgraded is rebooted. In contrast, prior to upgrading the router, the routers may use the same router ID. Doing so advertises to peer devices that the routers are the same device. However, when one router has been upgraded but the other has not, the IP addresses are changed to ensure that the connected devices do not treat the routers the same. For example, it may be desired that the upgraded router does not use the same router ID as the non-upgraded router when using IGP or LDP.

To access the customer devices 220, the upgraded router may need to learn the ID (e.g., BGP prefixes) for each customer device 220. Each remote PE 215 may include a routing application (a BGP application) that publishes and maintains the BGP prefixes required when generating data routes for accessing the customer devices 220.

For simplicity, the embodiments herein refer to the routing application specifically as a BGP application but this disclosure is not limited to such. For example, one of ordinary skill in the art will recognize that the embodiments disclosed herein may be modified for using network devices that use, e.g., tLDP applications for maintaining routing information of devices. Moreover, the BGP application may be part of the routers' operating systems or be composed of a plurality of different processes, rather than a single application, that performs the functions described herein.

For the upgraded router to receive the BGP prefixes from the BGP application executing on the remote PE 215 using the new router ID, an instruction containing the new ID has to be transmitted to the remote PEs 215 that instructs the PEs 215 to provide the prefixes to the upgraded router. Depending on the number of remote PEs 215 in the network 200, adding the new router ID to the BGP application on each remote PE 215 may require updating hundreds of remote PEs 215. Moreover, because of security concerns, the upgraded router may not have permission to add the new router ID to the list of approved devices that receive the BPG prefixes. Accordingly, the upgraded router may instead wait until the router is assigned the same router ID used before the upgrade was performed before receiving the BGP prefixes.

Figure 4:
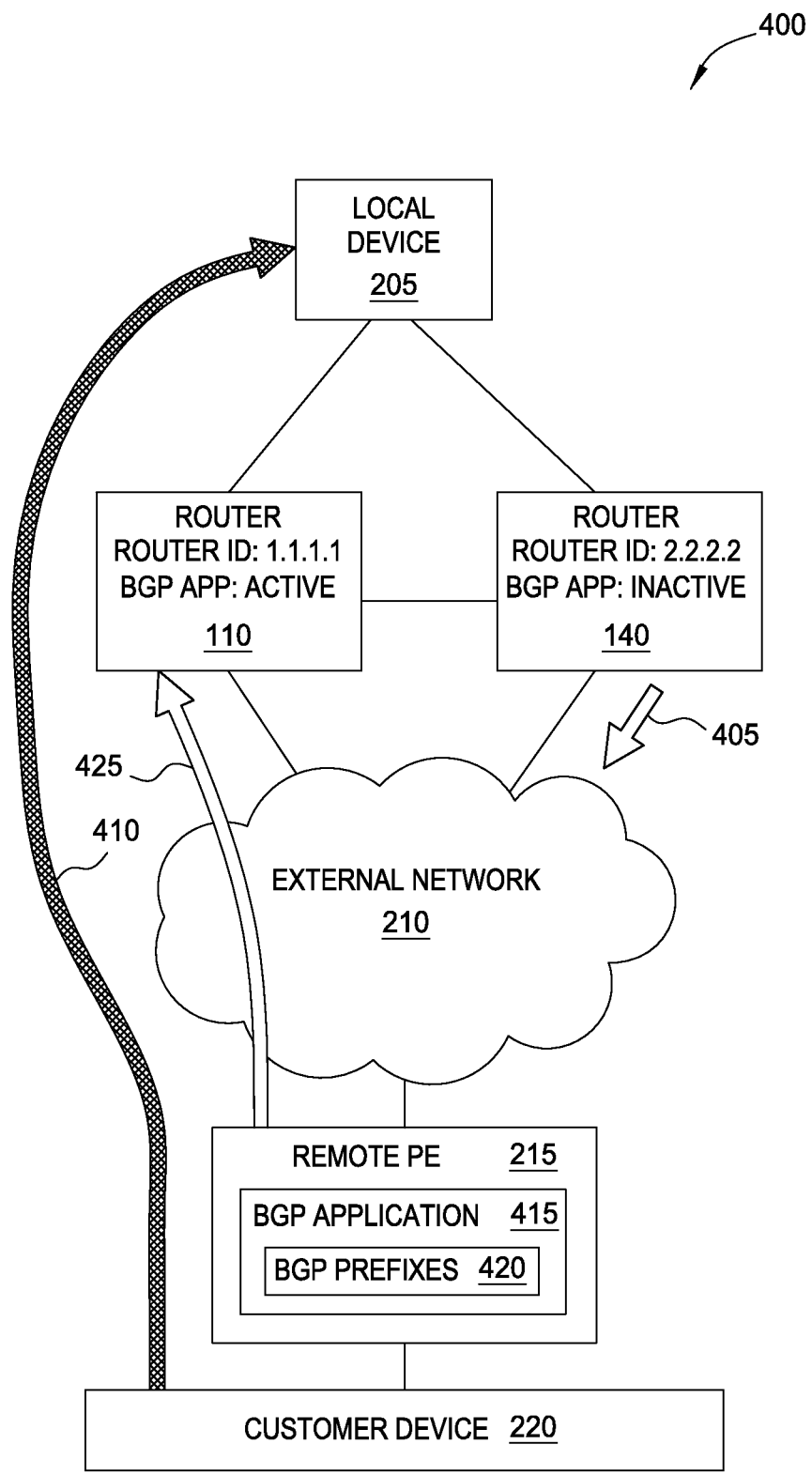
FIG. 4 illustrates data flow when upgrading a router in the virtual router, according to one embodiment disclosed herein.

FIG. 4 illustrates data flows after one of the routers in the virtual router is upgraded, according to one embodiment disclosed herein. Specifically, network 400 illustrates data flowing through routers 110, 140 after router 140 has been upgraded as discussed in blocks 305-315 of FIG. 3. For example, router 140 (i.e., the upgraded router) is assigned a different router ID—2.2.2.2—from router 110 (i.e., the non-upgraded router). As shown by arrow 405, router 140 may transmit some data traffic to the external network 210 but router 140 has a different ID and may advertise a very high-cost (low preference) so that data continues to flow through router 110. During this time, however, router 140 may not transmit data plane traffic between the external network 210 and the local device 205. Instead, router 140 may exchange only limited control plane traffic with the external network 210. In contrast, as shown by arrow 410, router 110 may continue to forward data plane traffic between local device 205 and customer device 215 using remote PE 215 and external network 210. That is, the data traffic may continue to flow through VR 100 using router 110.

Remote PE 215 includes a BGP application 415 that stores and manages the BGP prefixes 420 associated with customer devices 220. Periodically, remote PE 215 may transmit the BGP prefixes 420 to router 110 as shown by arrow 425. Of course, although not shown, router 110 may also send updates using its BGP application to the remote PE 425. Because router 140 has a different router ID—i.e., a router ID not recognized by the BGP application 415 executing on remote PE 215—BGP application 415 does not send the prefixes to router 140. In one embodiment, the routers 110 and 140 may be edge devices for connecting customer devices that are at remote sites in a VPN, but this is only one example of where this technique may be used.

Returning to FIG. 3, at block 325, the non-upgraded router deactivates its BGP application while the upgraded router activates its BGP application. In one embodiment these two actions may performed in parallel such that any time where neither BGP application is executing is minimized. Moreover, the non-upgraded router may begin to forward control plane traffic received from the remote PEs to the upgraded router to be processed by its BGP application. Specifically, the non-upgraded router may use the interconnect between the routers to forward any received BGP control plane traffic to the upgraded router. Similarly, the upgraded router may continue to transmit BGP control plane traffic to the remote PEs through the non-upgraded router. In this manner, the non-upgraded router no longer processes the BGP control plane packets but rather forwards these packets to the BGP application executing on upgraded router. However, the non-upgraded router may continue to forward the data plane traffic from the local devices to the remote devices. Because the non-upgraded router continues to process data plane traffic, in one embodiment, the upgraded router does not receive or forward data plane traffic at block 325.

At block 330, the upgraded router is assigned the same router ID as the non-upgraded router. In one embodiment, block 330 is performed in parallel with or in close proximity to block 325—e.g., when the BGP application on the upgraded router is activated, the upgraded router is assigned the same router ID as the non-upgraded router. In one embodiment, the router ID is the same ID used before the router was upgraded. That is, the router ID assigned at block 330 may be the ID recognized by the various BGP applications executing on the remote PEs that publish the BGP prefixes associated with the client devices connected to the remote PE.

Figure 5:
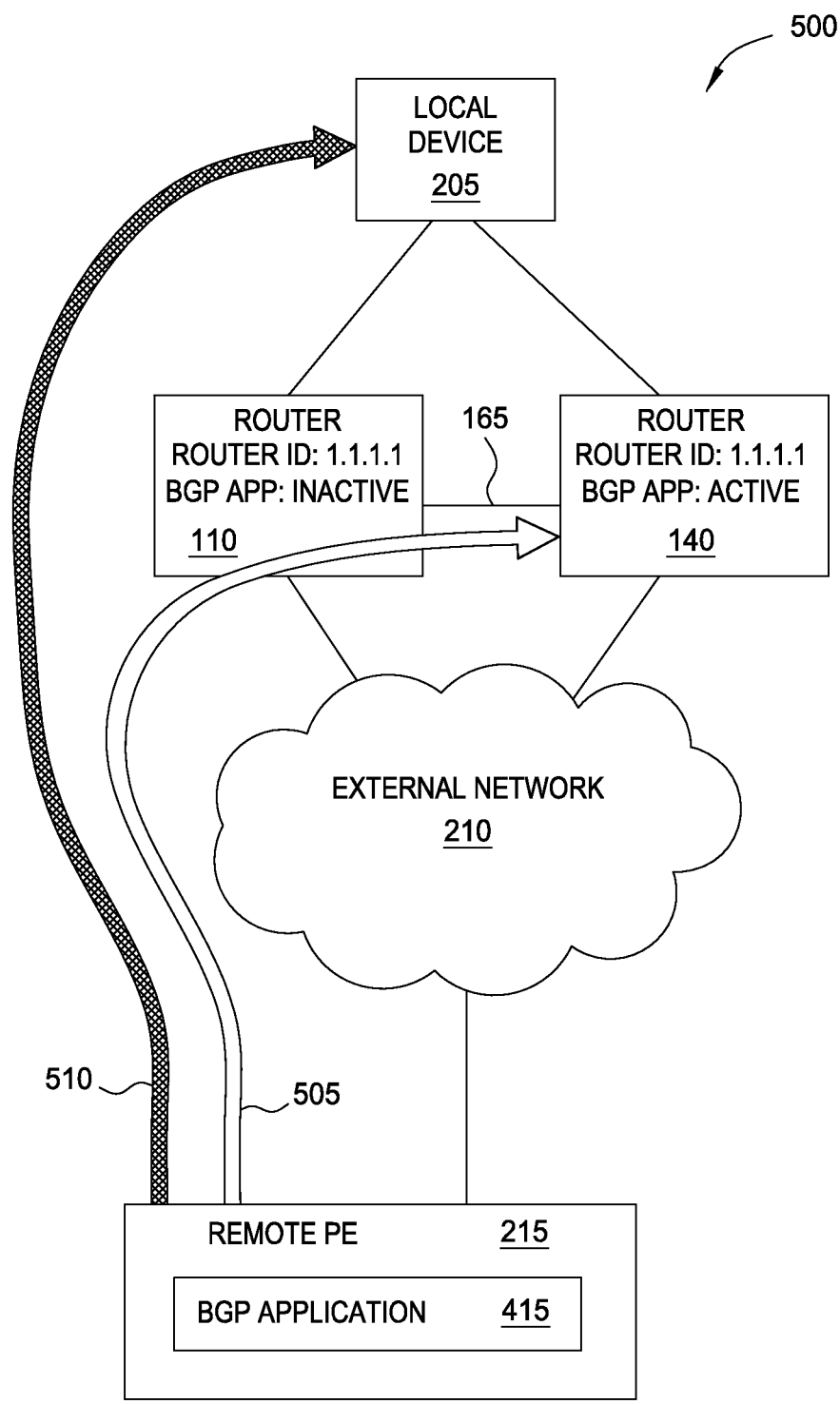
FIG. 5 illustrates data flow when upgrading the router in the virtual router, according to one embodiment disclosed herein.

FIG. 5 illustrates data flows after one of the routers in the virtual router is upgraded, according to one embodiment disclosed herein. Specifically, network 500 illustrates select data flows that occur after completing block 330 of FIG. 3. As shown by arrow 505, router 110 serves as an intermediary between router 140 and the remote PEs (e.g., remote PE 215). Thus, as BGP control plane traffic is received from remote PE 215, router 110 forwards the packets using interconnect 165 to router 140 to be processed by its now active BGP application. Moreover, router 110 no longer processes the BGP control plane packets since its BGP application is deactivated. As shown by arrow 510, data plane traffic, however, continues to flow through router 110 instead of flowing through router 140. Thus, in one embodiment, router 140 only receives and transmits control plane traffic while router 110 receives and transmits the data plane traffic between local devices 205 and customer devices (not shown) coupled to remote PE 215.

Moreover, the router ID of router 140 is assigned to be the same as the router ID of router 110. Thus, any BGP packets transmitted from router 140 to remote PE 215 contain a source header that identifies router 140 as the same device as router 110. For example, when the BGP application on router 140 activates, the application may transmit "hello" messages to all the remote PEs 215. To the perspective of remote PE 215, the hello messages originate from the same device that the remote PE 215 was communicating with previously—i.e., the remote PE 215 treats router 110 and 140 as the same device. Thus, when receiving the hello message, the remote PE 215 assumes that the BGP application for the device associated with router ID 1.1.1.1 has for some reason ceased working but has now come back online. In reality, the BGP application on router 110 was deactivated while the BGP application on router 140 was activated. However, because routers 110, 140 have the same ID, remote PE 215 merely detects that the BGP application for a single device was offline but is now online. Stated differently, the remote PE 215 may not have been informed that the BGP application was ever deactivated, but by virtue of receiving the hello message from the BGP application on router 140, the remote PE 215 assumes that the BGP application as some point was taken offline (e.g., the application failed and had to be restarted) and is now back online. In response to receiving an introduction message such as a hello message from a device that was previously in communication with the BGP application, the BGP application on the remote PE 215 may assume the device associated with the router ID 1.1.1.1 is performing a graceful restart.

Generally, a graceful restart prevents routing protocol reconvergence during a processor switchover following an upgrade. Traditionally, when a networking device restarts, all routing peers associated with that device detect the device has gone down and routes from that peer are removed. The session is re-established when the device completes the restart. This transition results in removal and re-insertion of routes, which could spread across multiple routing domains. Reconverging the routes was required because of the inability of the restarting device to forward traffic during the reload period. However, dual processor systems which support SSO or ISSU can continue to forward traffic while restarting the control plane on the second processor. The graceful restart suppresses routing changes on peers during the processor switchover. However, as discussed previously, SSO and ISSU are limited to certain types of upgrades. Nonetheless, even when performing upgrades where SSO and ISSU are insufficient, a VR may use the graceful restart to suppress routing changes while the routing application on one router is deactivated and the routing application on the other router is activated. Stated differently, when the BGP application is deactivated and then reactivated on two separate routers (which behave much like a dual-processor architecture on a single router), this event appears to the remote PE like a processor switchover in a dual-processor system, thereby triggering the graceful restart protocol.

Returning to FIG. 3, at block 335, the remote PE may determine that the VR is performing a graceful restart, and in response, maintain the existing routing information (i.e., suppress routing changes). In one embodiment, the remote PE holds the current data routes until the newly activated BGP application refreshes the routes. That is, the remote PE continues to forward data packets along the same data paths instead of attempting to identify different routes to the local devices.

In addition to maintaining the same data routes, as part of performing a graceful restart, each remote PE may transmit its BGP prefixes to the non-upgraded router which then forwards the prefixes to the active BGP application on the upgraded router. With this routing information, the upgraded router may populate routing tables for the plurality of linecards detailing how to route data through the external network and to the customer devices connected to the remote PE. This process may take up to several minutes depending on the complexity of the network (e.g., the number of remote PEs). Nonetheless, during this time, the remote PEs continue to transmit data plane traffic using the same data routes as shown by arrow 510 of FIG. 5. After resolving the data routes, the BGP application on router 140 may transmit updated router data to the remote PEs which completes the graceful restart.

Although the graceful restart is discussed in connection with the remote PE, the same process may be used to gather BGP routing information from BGP applications that may be executing on the local devices connected to the VR. For example, the VR may not be an edge device, and thus, may use the techniques discussed above for gathering routing information from network devices connected locally.

After gathering the routing information from the remote PEs, at block 345, the non-upgraded router may then be taken offline and upgraded in the same process used to upgrade the already upgraded router. Once the ports of the non-upgraded router are disabled, the external network and local device may automatically switch to using the second connection to transfer data to the VR. For example, referring to FIG. 2, the external network may cease using the connection to the non-upgraded router 110 and instead use the connection to the upgraded router 140 for transferring data and control plane traffic to VR 100. Similarly, the local devices 205 may also use only the connection to router 140 to transfer data to VR 100. This switch from using router 110 to using router 140 (or vice versus) of the VR may take only a few seconds to complete, thereby minimizing data loss.

At block 350, the routers may be rejoined into a single VR. For example, after both routers are upgraded, the routers may use the interconnect to share the same control plane. Specifically, after the non-upgraded router finishes performing the necessary upgrades, the router uses the interconnect to join the control plane of the previously upgraded router. The routers may then synchronize the data routes and balance the workload between the routers. In one embodiment, in order to join the routers into a single VR, the routers must be executing the same operating system (e.g., the same OS kernel).

Figure 6:
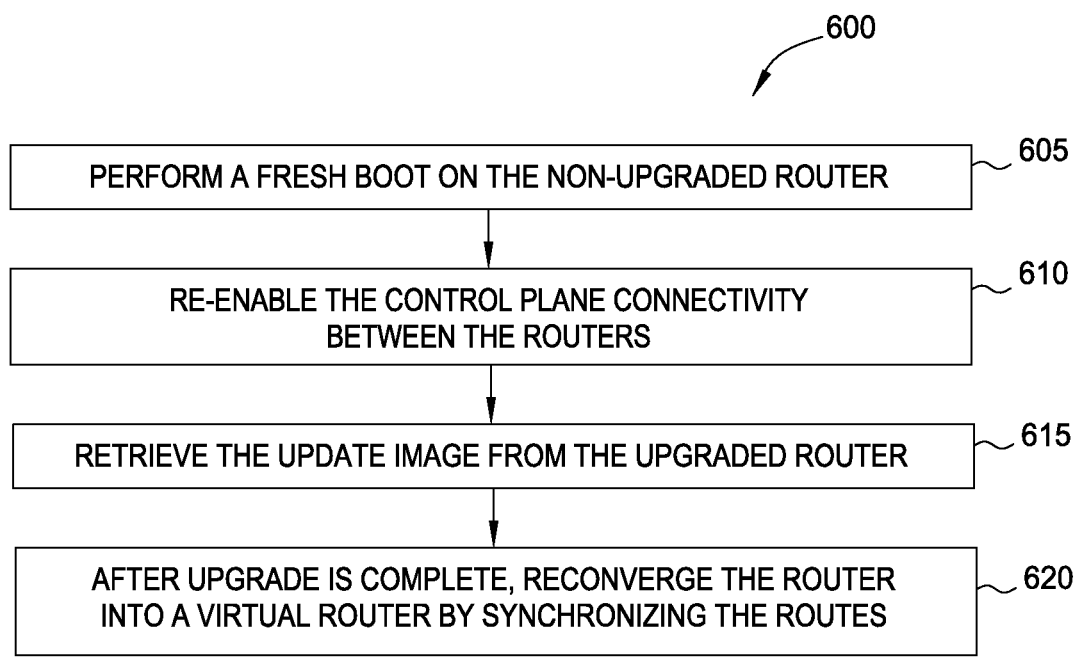
FIG. 6 illustrates a method for upgrading a router in the virtual router using the previously upgraded router, according to one embodiment disclosed herein.

FIG. 6 illustrates a method 600 for upgrading a router in the virtual router using the previously upgraded router, according to one embodiment disclosed herein. Specifically, FIG. 6 illustrates in further detail block 345 of FIG. 3 for upgrading the non-upgraded router in the VR. At block 605, the non-upgraded router is reset and instructed to perform a fresh boot. For example, this instruction may either come from a network administrator or the upgraded router which sends the instruction to the non-upgraded router after routing data has been resolved (e.g., after completion of block 340 of FIG. 3). As used herein, a fresh boot instructs the router to ignore the installed image and retrieve a new image from an external entity. For example, the image may be a new version of the operating system executing on the router.

In one embodiment, the external network may use priority or cost scores that are advertised by the two routers to determine which of the two connection paths to use. For example, the external network and routers may use a process known as interior gateway protocol (IGP) reconvergence to use the cost scores to select the data connection used to forward data to the VR. If the non-upgraded router advertises a low score and the upgraded router advertises a high score, the network devices will switch between routing data to the non-upgraded router to the upgraded router. Generally, IGP reconvergence takes only a few seconds to complete. Moreover, advertising costs score may also be used at block 310 of FIG. 3 to cause the external network to start transferring all data and control plane traffic to the non-upgraded router while the other router is taken offline to be upgraded.

After performing the fresh boot, at block 610 the routers may re-establish limited control plane connectivity via the interconnect. In one embodiment, even though the routers are able to communicate using the interconnect, the routers may not yet be sharing the same control plane. Instead, the non-upgraded router may use, for example, firmware to establish basic communication with the upgraded router using the interconnect.

At block 615, the non-upgraded router may download or retrieve the upgrade image from the upgraded router via the interconnect. In one embodiment, the non-upgraded router downloads the image before the operating system is executing on the router. For example, the non-upgraded router may have only limited firmware function that enables the non-upgraded router to request the image from the upgraded router and begin installation. The present disclosure, however, is not limited to retrieving the image from the upgraded router. Alternatively, a network administrator may provide the image to the router (e.g., via CD-ROM, Flash drive, USB drive, and the like) or the router may have a separate connection to another device (e.g., a data repository) that may provide the image to the non-upgraded router.

After the upgrade is complete, at block 620, the newly upgraded router may join the control plane of the previously upgraded router to form a VR with a shared control plane. As used herein, it is equally correct to characterize the term "VR" as containing two routers at all times (even when one of the routers is offline or is not forwarding traffic) or as containing only one router when the other router is offline or is not currently forwarding data plane traffic. Regardless of how the VR is described during the upgrade process, once both routers have been upgraded, the control planes may be shared which permits the data routes flowing through the VR to be synchronized.

As will be appreciated by one skilled in the art, embodiments may be embodied as a system, method or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of upgrading a virtual router comprising at least a first and a second physical router, the method comprising:
    disabling the first physical router such that data paths previously flowing through one or more linecards in the first physical router flow through one or more linecards in the second physical router;
    after upgrading the first physical router, starting a first routing application on the first physical router, wherein the second physical router is configured to forward received control plane packets associated with the first routing application to the first physical router;
    receiving, at the first physical router, routing information identifying user devices connected to a remote network device;
    after resolving data routes for transferring data traffic to the user devices connected to the remote network device based on the routing information, disabling the second physical router such that data paths previously flowing through the one or more linecards in the second physical router flow through the one or more linecards the first physical router; and
    after upgrading the second physical router, rejoining the control planes of the first and second physical routers such that the first and second physical routers share a common control plane and route data simultaneously.

2. The method of claim 1, further comprising:
    after upgrading the first physical router, assigning to the first physical router a first router ID that is different than a second router ID assigned to the second physical router; and
    before starting the first routing application, assigning the second router ID to the first physical router, wherein the first and second physical routers have a same router ID.

3. The method of claim 1, wherein each remote network device or user device coupled to the virtual router is communicatively coupled to both the first physical router and the second physical router.

4. The method of claim 1, further comprising, stopping a second routing application on the second physical router, wherein starting the first routing application and stopping the second routing application indicates to the remote network device to perform a graceful restart protocol, the graceful restart protocol instructing the remote network device to preserve existing routing information until receiving a routing update from the first routing application executing on the first physical router.

5. The method of claim 4, wherein the first and second routing applications are one of: border gateway protocol (BGP) applications and targeted label distribution protocol (tLDP) applications.

6. The method of claim 1, wherein the virtual router has first and second interfaces, wherein the first interface is coupled to local devices and the second interface is coupled to an external network that enables the local devices to communicate with the user devices coupled to the remote network device.

7. A virtual router, the virtual router comprising:
    a first physical router;
    a second physical router; and
    an interconnect communicatively coupling the first and second physical routers,
    wherein the first physical router is configured to:
        disable one or more ports such that data paths previously flowing through one or more linecards in the first physical router flow through one or more linecards in the second physical router, after performing a first upgrade, start a first routing application, wherein the second physical router is configured to forward received control plane packets associated with the first routing application to the first physical router, receive routing information identifying user devices connected to a remote network device, and resolve data routes for transferring data traffic to the user devices connected to the remote network device based on the routing information, wherein, after the data routes are resolved on the first physical router, the second physical router is configured to disable one or more ports such that data paths previously flowing through the one or more linecards in the second physical router flow through the one or more linecards in the first physical router and perform a second upgrade, wherein, after performing the second upgrade to the second physical router, the second physical router is further configured to rejoin the control planes of the first and second physical routers such that the first and second physical routers share a common control plane and are configured to route data simultaneously.

8. The virtual router of claim 7, wherein, after upgrading the first physical router, the first physical router is assigned a first router ID that is different than a second router ID assigned to the second physical router, and, before starting the first routing application, the first physical router is assigned the second router ID such that the first and second physical routers have a same router ID.

9. The virtual router of claim 7, wherein each remote network device or user device coupled to the virtual router is communicatively coupled to both the first physical router and the second physical router.

10. The virtual router of claim 7, wherein the second physical router is configured to stop a second routing application in parallel with starting the first routing application on the first physical router, wherein starting the first routing application and stopping the second routing application indicates to the remote network device to perform a graceful restart protocol, the graceful restart protocol instructing the remote network device to preserve existing routing information until receiving a routing update from the first routing application executing on the first physical router.

11. The virtual router of claim 10, wherein the first and second routing applications are one of: border gateway protocol (BGP) applications and targeted label distribution protocol (tLDP) applications.

12. The virtual router of claim 7, wherein the virtual router has first and second interfaces, wherein the first interface is coupled to local devices and the second interface is coupled to an external network that enables the local devices to communicate with the user devices coupled to the remote network device.

13. A non-transitory computer readable storage medium for upgrading a virtual router comprising at least a first and a second physical router, the computer readable storage medium comprising:

computer code that disables the first physical router such that data paths previously flowing through one or more linecards in the first physical router flow through one or more linecards in the second physical router;

computer code that, after upgrading the first physical router, starts a first routing application on the first physical router, wherein the second physical router is configured to forward received control plane packets associated with the first routing application to the first physical router;

computer code that receives, at the first physical router, routing information identifying user devices connected to a remote network device;

computer code that, after resolving data routes for transferring data traffic to the user devices connected to the remote network device based on the routing information, disables the second physical router such that data paths previously flowing through the one or more linecards in the second physical router flow through the one or more linecards in the first physical router; and computer code that, after upgrading the second physical router, rejoins the control planes of the first and second physical routers such that the first and second physical routers share a common control plane and route data simultaneously.

14. The computer readable storage medium of claim 13, further comprising:

computer code that, after upgrading the first physical router, assigns to the first physical router a first router ID that is different than a second router ID assigned to the second physical router; and computer code that, before starting the first routing application, assigns the second router ID to the first physical router, wherein the first and second physical routers have a same router ID.

15. The computer readable storage medium of claim 13, wherein each remote network device or user device coupled to the virtual router is communicatively coupled to both the first physical router and the second physical router.

16. The computer readable storage medium of claim 13, further comprising computer code configured to stop a second routing application on the second physical router, wherein starting the first routing application and stopping the second routing application indicates to the remote network device to perform a graceful restart protocol, the graceful restart protocol instructing the remote network device to preserve existing routing information until receiving a routing update from the first routing application executing on the first physical router.

17. The computer readable storage medium of claim 16, wherein the first and second routing applications are one of: border gateway protocol (BGP) applications and targeted label distribution protocol (tLDP) applications.

* * * * *